United States Patent
Kim et al.

(10) Patent No.: US 10,381,665 B2
(45) Date of Patent: Aug. 13, 2019

(54) DEVICE AND METHOD FOR HEATING FUEL CELL STACK AND FUEL CELL SYSTEM HAVING THE DEVICE

(71) Applicant: SK Innovation Co., Ltd., Seoul (KR)

(72) Inventors: Young Dae Kim, Daejeon (KR); Seong Je Wu, Daejeon (KR); Jeong Pyo Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 54 days.

(21) Appl. No.: 15/622,720

(22) Filed: Jun. 14, 2017

(65) Prior Publication Data

US 2017/0279135 A1    Sep. 28, 2017

Related U.S. Application Data (62) Division of application No. 14/316,991, filed on Jun. 27, 2014, now Pat. No. 9,711,806.

(30) Foreign Application Priority Data

Oct. 11, 2013 (KR) ........................ 10-2013-0121490

(51) Int. Cl.
*H01M 8/124* (2016.01)
*H01M 8/249* (2016.01)
(Continued)

(52) U.S. Cl.
CPC ... *H01M 8/04022* (2013.01); *H01M 8/04014* (2013.01); *H01M 8/0432* (2013.01);
(Continued)

(58) Field of Classification Search
None
See application file for complete search history.

(56) References Cited

U.S. PATENT DOCUMENTS 6,124,053 A    9/2000   Bernard

FOREIGN PATENT DOCUMENTS

| CN | 100454649 C | 11/2006 |
|----|-------------|---------|
| JP | 004867347 B2 | 2/2012 |

(Continued)

OTHER PUBLICATIONS

Office Action for counterpart Chinese application 201410351626.7, dated Apr. 18, 2018 (12 pages).

(Continued)

*Primary Examiner* — Daniel S Gatewood
(74) *Attorney, Agent, or Firm* — Abelman, Frayne & Schwab (57) ABSTRACT

Provided is device and method for heating fuel cell stack and fuel cell system having the device. The fuel cell system includes: a power generating unit having fuel cell stacks arranged with an interval defined between the stacks; an outlet manifold unit provided outside each fuel cell stack and guiding a reaction mixture discharged from each stack to outside; an inlet manifold unit provided on each stack at a location opposed to the outlet manifold unit based on the stack, the inlet manifold unit supplying fuel and air supplied through a fuel supply pipe and an air supply pipe into the stack; and a subsidiary fuel supply unit for supplying subsidiary fuel into the outlet manifold unit such that the subsidiary fuel is burnt in the outlet manifold unit so as to heat both the outlet manifold unit and the stack coming into contact with the outlet manifold unit.

6 Claims, 4 Drawing Sheets

(51) Int. Cl.
- *H01M 8/0432* (2016.01)
- *H01M 8/2425* (2016.01)
- *H01M 8/2483* (2016.01)
- *H01M 8/2484* (2016.01)
- *H01M 8/2485* (2016.01)
- *H01M 8/04014* (2016.01)
- *H01M 8/04082* (2016.01)
- *H01M 8/04089* (2016.01)
- *H01M 8/04664* (2016.01)
- *H01M 8/04701* (2016.01)
- *H01M 8/04746* (2016.01)

(52) U.S. Cl.
CPC ... *H01M 8/04201* (2013.01); *H01M 8/04701* (2013.01); *H01M 8/04738* (2013.01); *H01M 8/04776* (2013.01); *H01M 8/249* (2013.01); *H01M 8/2425* (2013.01); *H01M 8/2483* (2016.02); *H01M 8/2484* (2016.02); *H01M 8/2485* (2013.01); *H01M 8/04097* (2013.01); *H01M 8/04679* (2013.01); *H01M 2008/1293* (2013.01)

(56) References Cited

FOREIGN PATENT DOCUMENTS

| | | | |
|---|---|---|---|
| WO | 2005038973 | A1 | 4/2005 |
| WO | 2005055352 | A1 | 6/2005 |

OTHER PUBLICATIONS

Office Action for counterpart Korean application 10-2013-0121490, dated Apr. 19, 2019 (6 pages).

DEVICE AND METHOD FOR HEATING FUEL CELL STACK AND FUEL CELL SYSTEM HAVING THE DEVICE

CROSS REFERENCE TO RELATED APPLICATION(S)

This application is a divisional of and claims priority to U.S. patent application Ser. No. 14/316,991 filed 27 Jun. 2014, and both claim the benefit of Korean Patent Application No. 10-2013-0121490, filed on Oct. 11, 2013, which is hereby incorporated by reference in its entirety into this application.

BACKGROUND OF THE INVENTION

1. Field of the Invention

The present invention relates to device and method for heating a fuel cell stack and to a fuel cell system having the heating device.

2. Description of the Related Art

The deposits of fossil fuels, such as coal, gas and petroleum, generally used as conventional energy sources are limited, so substitutional energy that can substitute for fossil fuels has become a great matter of social and national concern and interest in recent years. For example, the need for power generation using solar heat, tidal power and wind power instead of fossil fuels, such as coal, gas and petroleum, or the need for power generation using fuel cells is emphasized.

Of the proposed substitutional energy sources, fuel cells are designed to generate electricity using a reverse reaction of the electrolytic reaction of water. The fuel cells use a technology of converting oxygen contained in air and hydrogen contained in hydrocarbon-based materials, such as natural gas, coal gas and methanol, into electric energy through an electrochemical reaction.

Unlike a conventional power generation technology requiring a variety of processes, such as combustion of fuel, generation of steam, driving of a turbine, and driving of a power generator, the fuel cells neither require combustion of fuel nor use driving devices, so the fuel cells are advantageous in that the fuel cells can realize high operational efficiency, produce few air pollutants, such as SOx and NOx, reduce the amount of carbon dioxide generated therefrom, and are less likely to produce operational noises or vibrations.

Various kinds of fuel cells have been proposed and used in the related art. For example, phosphoric acid fuel cells (PAFC), alkaline fuel cells (AFC), polymer electrolyte membrane fuel cells (PEMFC), direct methanol fuel cells (DMFC), and solid oxide fuel cells (SOFC) have been proposed and used in the related art.

The solid oxide fuel cell (SOFC) is a fuel cell, in which a solid oxide through which oxygen ions or hydrogen ions can permeate is used as an electrolyte. In the solid oxide fuel cell (SOFC), all the elements constituting the fuel cell are solid elements, so the solid oxide fuel cell is advantageous in that it has a simple construction, is free from loss of the electrolyte, thereby requiring no replenishment of the electrolyte, and is free from corrosion of other materials, compared to other type fuel cells. Further, the solid oxide fuel cell is operated at a high temperature, so the solid oxide fuel cell does not require precious metal catalysts, but fuel can be easily and efficiently supplied to the fuel cell through a direct internal reforming process. Another advantage of the solid oxide fuel cell (SOFC) resides in that the fuel cell discharges high-temperature gas, so the solid oxide fuel cell can be efficiently used for combined heat and power generation using waste heat.

In the solid oxide fuel cell (SOFC), electrode reactions expressed by the following reaction formulas are performed.

Fuel electrode: $H_2 + O^{2-} \rightarrow H_2O + 2e^-$ $CO + O^{2-} \rightarrow CO_2 + 2e-$ Air electrode: $O_2 + 4e- \rightarrow 2O^{2-}$ Overall reaction: $H_2 + CO + O_2 \rightarrow H_2O + CO_2$     <Reaction Formulas>

In the fuel cell operated according to the above-mentioned reaction formulas, electrons reach the air electrode after passing through an external circuit, and, at the same time, oxygen ions generated from the air electrode move to the fuel electrode via the electrolyte, so hydrogen or CO is combined with the oxygen ions at the fuel electrode, thereby producing electrons and water or $CO_2$.

In a solid oxide fuel cell system, a stack that is formed by laminating a plurality of unit cells is used as a base unit. To increase the capacity of the solid oxide fuel cell system, a plurality of fuel cell stacks is connected to each other in series, in parallel or in series-parallel.

Figure 1:
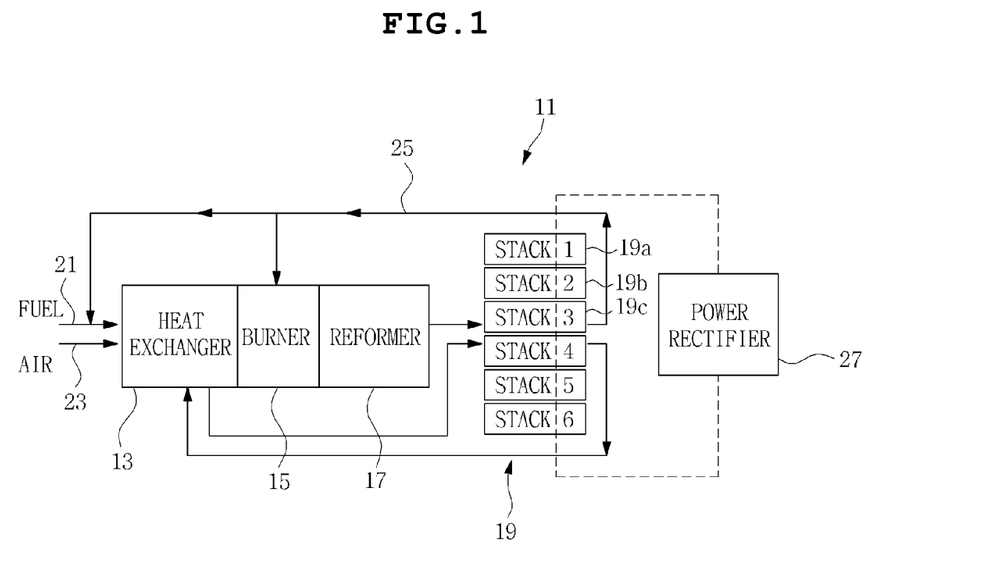
FIG. 1 is a view illustrating the construction of a related art fuel cell system, in which problems of related art fuel cell stacks are shown.

FIG. 1 is a view illustrating the construction of a related art fuel cell system, in which problems of related art fuel cell stacks are shown.

As shown in FIG. 1, the related art fuel cell system 11 includes a power generating unit 19 formed by laminating a plurality of unit stacks 19a, 19b and 19c, a heat exchanger 13, a burner 15, a reformer 17, a power rectifier 27, etc.

Here, the unit stacks 19a, 19b and 19c are combined with each other in a state in which laminated unit cells are enclosed in each unit stack that comes into close contact with neighboring unit stacks. Electric power generated by the power generating unit 19 is appropriately processed by the power rectifier 27, and is then supplied to an external device requiring electric power.

The burner 15 receives gas from the back of the unit stacks 19a, 19b and 19c via a recycling pipe 25, and heats both the reformer 17 and the heat exchanger 13, and causes the reformer 17 to reform fuel, thereby supplying hydrogen-rich gas to the respective unit stacks of the power generating unit 19.

In the heat exchanger 13, heat is transferred from high-temperature unreacted gas (hydrogen, air, etc.) that has been discharged from the power generating unit 19 and recycled by the recycling pipe 25 to fuel and air that have been newly introduced from the outside, thereby heating the fuel and air.

However, the related art fuel cell system 11 is problematic in that, because the unit stacks constituting the power generating unit 19 come into close contact with each other, deterioration in operational performance of a stack may easily ill-affect the other stacks placed near the deteriorated stack. In other words, a reduction in the performance of a stack may be easily propagated to the other stacks.

Described in detail, when a problem occurs in a unit stack and deteriorates the performance of the unit stack, a leaning of current from the deteriorated stack to the other stacks placed near the deteriorated stack is generated, so a heat balance between the unit stacks may be broken, thereby greatly reducing the performance of the fuel cell system 11. In other words, when the temperature of a unit stack is reduced (due to various abnormal reasons), temperatures of neighboring unit stacks that come into close contact with the deteriorated unit stack will be reduced, thereby inducing a great reduction in the performance of the fuel cell system.

As well known to those skilled in the art, in a high-temperature fuel cell, such as SOFC, the operating temperatures of respective unit stacks impose great effect on the operational performance of the stacks, such as output power and durability of the stacks, so it is very important to maintain desired operating temperatures of the unit stacks and to maintain a heat balance between neighboring unit stacks. However, in the conventional power generating unit 19, the unit stacks are brought into close contact with each other, and no heating unit for increasing the temperature of a unit stack to a normal temperature range when the temperature of the unit stack is reduced is provided, so it is difficult to maintain optimal output power of the fuel cell system.

SUMMARY OF THE INVENTION

Accordingly, the present invention has been made keeping in mind the above problems occurring in the related art, and the present invention is intended to propose a fuel cell system, in which fuel cell stacks are arranged in a state of being spaced apart from each other, so heat transfer does not occur between the stacks, and the stacks are not thermally affected by each other, and in which inlet manifold units and outlet manifold units are arranged between the stacks in such a way that the outlet manifold units functioning as heating sources can individually heat the respective stacks, thereby protecting the stacks from problems that may be caused by a reduction in temperatures of the stacks, and maintaining optimal power generating efficiency of the stacks, and the present invention is also intended to propose a device and method for heating a fuel cell stack, in which the outlet manifold units can be individually heated.

In order to achieve the above object, according to one aspect of the present invention, there is provided a device for heating a fuel cell stack of a fuel cell system, in which, when the temperature of an operating fuel cell stack has been reduced to a level out of a normal temperature range, the device heats the stack so as to maintain the temperature of the stack at a level within the normal temperature range, and which includes: an outlet manifold unit installed outside the fuel cell stack and guiding a reaction mixture discharged from the stack to outside of the stack; and a subsidiary fuel supply unit for supplying subsidiary fuel into the outlet manifold unit such that the subsidiary fuel is burnt in the outlet manifold unit so as to heat both the outlet manifold unit and the fuel cell stack coming into contact with the outlet manifold unit.

The fuel cell stack may include two or more stacks that are arranged with an interval defined between the stacks, wherein an inlet manifold unit may be provided on each of the stacks at a location opposed to the outlet manifold unit based on the stack, the inlet manifold unit supplying fuel and air into the stack.

The outlet manifold unit may include therein: a cathode out part through which a reaction mixture discharged from a cathode of the stack passes; and an anode out part separated from the cathode out part by a partition wall, the anode out part receiving a reaction mixture discharged from an anode of the stack, so the reaction mixture passes through the anode out part.

Further, the subsidiary fuel supply unit may include: a subsidiary fuel pipe for guiding the subsidiary fuel that is a part of fuel supplied to the stack to an interior of the cathode out part of the outlet manifold unit; and a flow control unit installed in the subsidiary fuel pipe and controlling a flow rate of the subsidiary fuel flowing through the subsidiary fuel pipe.

The cathode out part of the outlet manifold unit may be provided with a combustion inducing unit for inducing combustion of the subsidiary fuel that has been flowed into the cathode out part.

The device may further include: a control unit for controlling the flow control unit; and a sensor provided on the stack so as to sense the temperature of the stack, wherein the control unit controls the flow control unit based on information about the temperature of the stack output from the sensor, thereby controlling the amount of supplied subsidiary fuel.

In the device, a combustion gas exhaust pipe may be mounted to the cathode out part and discharges combustion exhaust gas of the subsidiary fuel generated from the cathode out part to the outside.

In another aspect, the present invention provides a method of operating a device for individually heating fuel cell stacks, in which the device includes: a power generating unit having a plurality of fuel cell stacks arranged with an interval defined between the stacks; an outlet manifold unit provided outside each of the fuel cell stacks and guiding a reaction mixture discharged from each of the stacks to outside of the stack; and a subsidiary fuel supply unit for supplying subsidiary fuel into the outlet manifold unit such that the subsidiary fuel is burnt in the outlet manifold unit so as to heat both the outlet manifold unit and the stack coming into contact with the outlet manifold unit, and which includes: a primary temperature sensing operation for sensing a temperature of a fuel cell stack; a primary determining operation for determining whether the temperature of the stack sensed at the primary temperature sensing operation is within a normal temperature range or not; a manifold heating operation for supplying subsidiary fuel from a subsidiary fuel supply unit to an outlet manifold unit and heating the outlet manifold unit when it is determined at the primary determining operation that the temperature of the stack is not within the normal temperature range; a secondary temperature sensing operation for sensing a temperature of the stack heated at the manifold heating operation; a secondary determining operation for determining whether the temperature of the stack sensed at the secondary temperature sensing operation is within the normal temperature range or not; and a subsidiary fuel blocking operation for blocking a flow of the subsidiary fuel by controlling the subsidiary fuel supply unit when it is determined at the secondary determining operation that the sensed temperature of the stack is within the normal temperature range.

Further, the outlet manifold unit may include: a cathode out part through which a reaction mixture discharged from a cathode of the stack passes; and an anode out part separated from the cathode out part by a partition wall, the anode out part receiving a reaction mixture discharged from an anode of the stack, so the reaction mixture passes through the anode out part, and the subsidiary fuel supply unit includes: a subsidiary fuel pipe for guiding the subsidiary fuel that is a part of fuel supplied to the stack to an interior of the cathode out part of the outlet manifold unit; and a flow control unit installed in the subsidiary fuel pipe and controlling a flow rate of the subsidiary fuel flowing through the subsidiary fuel pipe. Here, the manifold heating operation may be an operation for supplying the subsidiary fuel into the cathode out part by controlling the flow control unit.

Further, the subsidiary fuel blocking operation may be an operation for blocking the flow of the subsidiary fuel flowing to the cathode out part by closing the flow control unit.

In a further aspect, the present invention provides a fuel cell system, including: a power generating unit having a plurality of fuel cell stacks arranged with an interval defined between the stacks; an outlet manifold unit provided outside each of the fuel cell stacks and guiding a reaction mixture discharged from each of the stacks to outside of the stack; an inlet manifold unit provided on each of the stacks at a location opposed to the outlet manifold unit based on the stack, the inlet manifold unit supplying fuel and air which are supplied from outside through a fuel supply pipe and an air supply pipe into the stack; and a subsidiary fuel supply unit for supplying subsidiary fuel into the outlet manifold unit such that the subsidiary fuel is burnt in the outlet manifold unit so as to heat both the outlet manifold unit and the stack coming into contact with the outlet manifold unit.

Here, the outlet manifold unit may include therein: a cathode out part through which a reaction mixture discharged from a cathode of each of the stacks passes; and an anode out part separated from the cathode out part by a partition wall, the anode out part receiving a reaction mixture discharged from an anode of the stack, so the reaction mixture passes through the anode out part.

Further, the subsidiary fuel supply unit may include: a subsidiary fuel pipe for guiding the subsidiary fuel that is a part of fuel supplied to each of the stacks to the interior of the cathode out part of the outlet manifold unit; and a flow control unit installed in the subsidiary fuel pipe and controlling the flow rate of the subsidiary fuel flowing through the subsidiary fuel pipe.

Further, the cathode out part of the outlet manifold unit may be provided with a combustion inducing unit for inducing combustion of the subsidiary fuel that has been flowed into the cathode out part.

Further, the fuel cell system may further include: a control unit for controlling the flow control unit; and a sensor provided on each of the stacks so as to sense a temperature of each of the stacks, wherein the control unit controls the flow control unit based on information about the temperature of the stack output from the sensor, thereby controlling the amount of supplied subsidiary fuel.

Further, a combustion gas exhaust pipe may be mounted to the cathode out part and discharges combustion exhaust gas of the subsidiary fuel generated from the cathode out part to the outside.

The fuel cell system may further include: a heat exchanger provided between the combustion gas exhaust pipe and the air supply pipe so as to transfer heat of the combustion gas exhaust pipe to the air supply pipe.

Further, the fuel cell system may further include: a recycling pipe mounted to the anode out part, the recycling pipe receiving and guiding a reaction mixture, thereby discharging the reaction mixture to the outside after the reaction mixture passes through the anode out part; and a heat exchanger provided between the recycling pipe and the fuel supply pipe.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms to describe most appropriately the best method he or she knows for carrying out the invention.

In the above-mentioned fuel cell system according to the present invention, the fuel cell stacks are arranged in a state of being spaced apart from each other, so heat transfer does not occur between the stacks, and the stacks are not thermally affected by each other, and in which the inlet manifold units and the outlet manifold units are arranged between the stacks in such a way that the outlet manifold units functioning as heating sources can individually heat the respective stacks, so the present invention can protect the stacks from problems that may be caused by a reduction in temperatures of the stacks, and can maintain optimal power generating efficiency of the stacks.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The above and other objects, features and advantages of the present invention will be more clearly understood from the following detailed description taken in conjunction with the accompanying drawings.

Reference now should be made to the drawings, in which the same reference numerals are used throughout the different drawings to designate the same or similar components.

Further, it will be understood that, although the terms "first," "second," etc. may be used herein to describe various elements, these elements should not be limited by these terms.

Further, when it is determined that the detailed description of the known art related to the present invention might obscure the gist of the present invention, the detailed description thereof will be omitted.

Hereinbelow, exemplary embodiments of the present invention will be described in detail with reference to the accompanying drawings.

Figure 2:
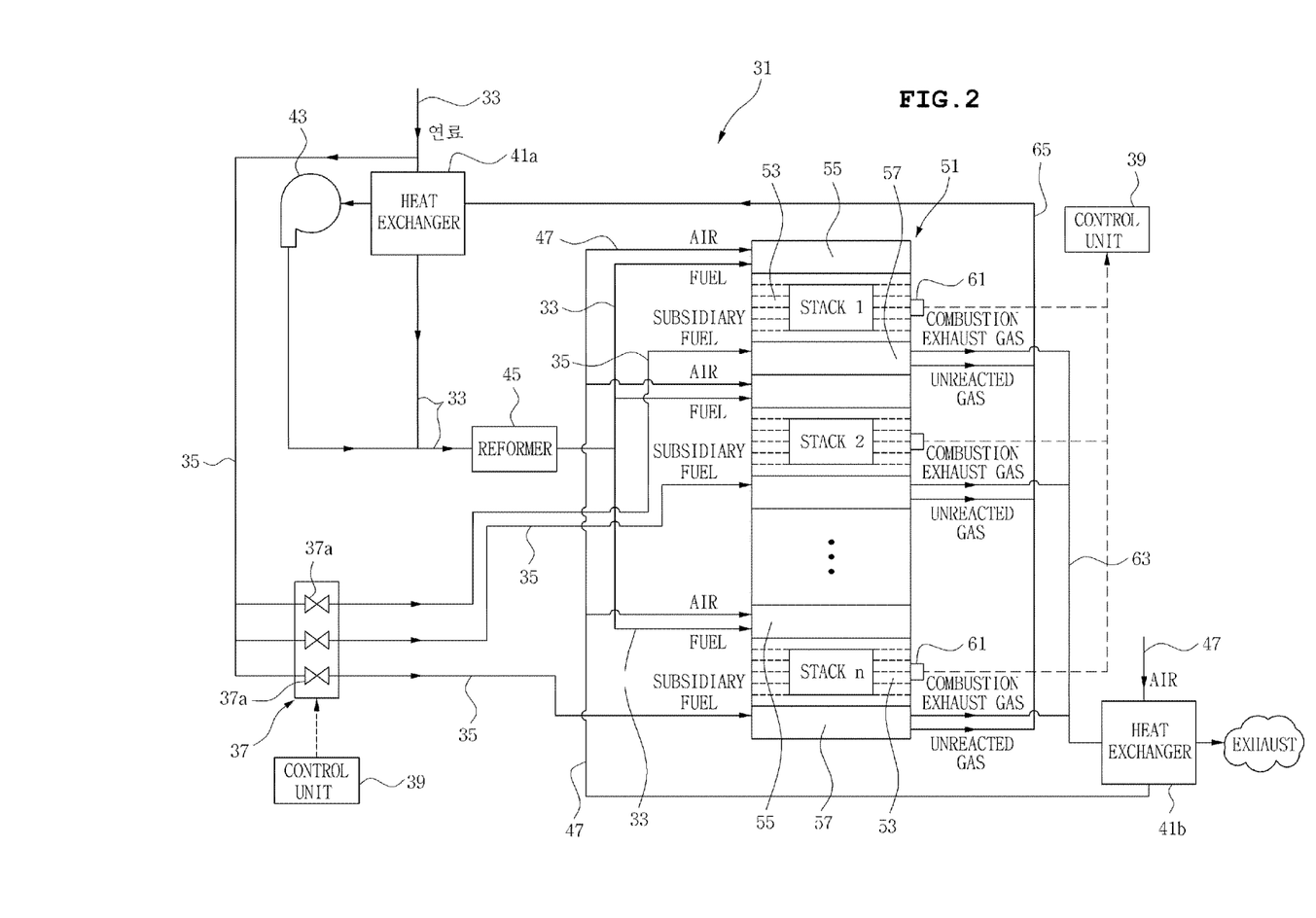
FIG. 2 is a view illustrating the construction of a fuel cell system according to an embodiment of the present invention, in which the operational theory of an individual heating device configured to individually heat fuel cell stacks is shown.
Figure 3:
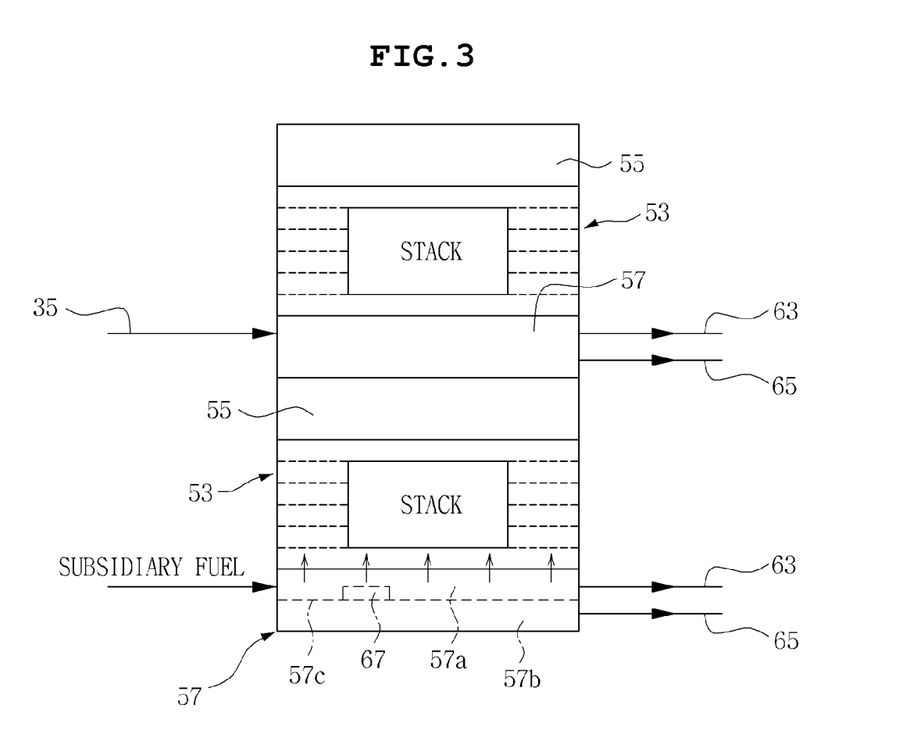
FIG. 3 is a view illustrating the operational theory of the individual heating device of the fuel cell system of FIG. 2 in more detail.

FIG. 2 is a view illustrating the construction of a fuel cell system 31 according to an embodiment of the present invention, in which the operational theory of an individual heating device configured to individually heat the fuel cell stacks is shown. FIG. 3 is a view illustrating the operational theory of the individual heating device of the fuel cell system 31 shown in FIG. 2, in more detail.

As shown in FIGS. 2 and 3, the fuel cell system 31 according to the embodiment of the present invention includes: a power generating unit 51 having a plurality of fuel cell stacks 53 that are sequentially arranged in a vertical direction with intervals defined between the stacks; inlet manifold units 55 closely installed on respective stacks 53; outlet manifold units 57 closely installed below the respective stacks 53; and an individual heating device configured such that, when the temperature of an operating fuel cell stack is reduced, the individual heating device individually heats the relevant stack, thereby maintaining the temperature of the relevant stack within a normal temperature range.

The individual heating device includes a subsidiary fuel supply unit that can supply subsidiary fuel into a selected outlet manifold unit 57, so the subsidiary fuel can be burnt in the outlet manifold unit 57 and can heat both the outlet manifold unit and a fuel cell stack 53 that contacts with the outlet manifold unit.

The stacks 53 constituting the power generating unit 51 comprise an n number of stacks that are arranged on top of one another with an interval defined between the stacks 53. Further, laminated unit cells are enclosed in each of the stacks 53. In other words, the construction of each of the stacks 53 remains the same as a conventional stack.

The fuel cell system 31 of this embodiment is characterized in that the stacks 53 are arranged in a state in which each of the stacks 53 is spaced apart from neighboring stacks 53, with an inlet manifold unit 55 and an outlet manifold unit 57 interposed between two neighboring stacks 53.

Because the stacks 53 are spaced from each other as described above, no heat transfer occurs between the stacks 53. Further, the outlet manifold units 57 and associated inlet manifold units 55 are combined with each other, and mechanically fix the stacks 53 to each other. Particularly, each of the outlet manifold units 57 is heated by subsidiary fuel supplied from an external source, and heats an associated stack 53 placed thereon.

Here, each of the inlet manifold units 55 is connected both to an end of a fuel supply pipe 33 and to an end of an air supply pipe 47. Thus, fuel that has been supplied to the inlet manifold unit 55 via the fuel supply pipe 33 after passing a reformer 45 is supplied to a fuel electrode (not shown) inside each of the stacks 53 after passing the inlet manifold unit 55, and air that has been supplied to the inlet manifold unit 55 via the air supply pipe 47 is supplied to an air electrode inside each of the stacks 53 after passing through the inlet manifold unit 55, so the fuel and air can participate in an electrochemical reaction.

Further, the outlet manifold units 57 function to guide the reaction mixture (water, unreacted hydrogen, air, etc.) discharged from the stacks 53 to the atmosphere. Here, the reaction mixture passes through the outlet manifold units 57 prior to being guided to the atmosphere.

Particularly, as shown in FIG. 3, each of the outlet manifold units 57 includes a cathode out part 57a and an anode out part 57 which are separated from each other by a partition wall 57c. Here, the cathode out part 57a is a chamber through which the reaction mixture generated from the cathode of an associated stack 53 passes, and the anode out part 57b is a chamber that receives the reaction mixture generated from the anode of an associated stack 53 and guides the reaction mixture to a recycling pipe 65.

Further, each of the cathode out parts 57a of the outlet manifold units 57 is provided with a combustion inducing unit 67 therein. The combustion inducing unit 67 functions to promote firing of the subsidiary fuel that has flowed into the cathode out part 57a, so the unit 67 induces combustion of the subsidiary fuel. Here, a diffusion-type combustor or a catalytic combustor may be used as the combustion inducing unit 67.

During the operation of the fuel cell system 31, the outlet manifold units 57 have been heated to a high temperature not less than 600° C. due to the continuous operation of the power generating unit 51 (the inlet manifold units 55 heated in the same manner), so the subsidiary fuel will be naturally and immediately ignited after the subsidiary fuel flows into the cathode out parts 57a. Accordingly, the combustion inducing units 67 may be omitted from the fuel cell system 31.

The individual heating device is configured such that, when the temperature of an operating fuel cell stack of the power generating unit 51 is lowered, the individual heating device individually heats the relevant stack, thereby maintaining the temperature of the relevant stack within a normal temperature range.

The individual heating device having the above-mentioned function includes the subsidiary fuel supply unit that can supply the subsidiary fuel to the cathode out part 57a of a selected outlet manifold unit 57.

The subsidiary fuel supply unit includes: a subsidiary fuel pipe 35 that guides subsidiary fuel which is a part of fuel that flows from the fuel supply pipe 33 to the respective stacks 53 to the interior of a selected cathode out part 57a, and a flow control unit 37 that is installed in the subsidiary fuel pipe 35 and controls the flow rate of the subsidiary fuel flowing through the subsidiary fuel pipe 35. Here, the flow control unit 37 includes a plurality of valves 37a.

Here, the subsidiary fuel is supplied to the cathode out parts 57 in a state before being reformed by the reformer 45. When the subsidiary fuel flows into a high temperature cathode out part 57a, the subsidiary fuel is naturally ignited and heats the outlet manifold unit 57. Here, the outlet manifold unit 57 comes into close contact with the lower surface of an associated stack 53, so, when heating the outlet manifold unit 57 as described above, the outlet manifold unit 57 can heat the stack 53.

The flow rates of the subsidiary fuel supplied to the cathode out parts 57a will be increased in proportion to the opening ratios of the valves 37a. When completely closing the valves 37a, no subsidiary fuel will be supplied to the cathode out parts 57a.

The valves 37a may be manual valves or solenoid valves that will be operated in response to electric signals output from the control unit 39.

Here, sensors 61 are installed on the side surfaces of the respective stacks 53. The sensors 61 function to sense the temperatures of the respective stacks 53 in real time. Information about the temperatures sensed by the sensors 61 is supplied to an operator via a display unit (not shown).

Further, the control unit 39 determines whether it is required to open a valve 37a or not based on information about temperatures output from the sensors 61. When the temperature of a stack 53 is lower than temperatures of neighboring stacks, the control unit 39 opens a valve 37a associated with the low temperature stack 53, thereby supplying subsidiary fuel to the cathode out part 57a of the outlet manifold unit 57 that comes into contact with the low temperature stack 53.

Unreacted hydrogen contained in the respective anode out parts 57b of the outlet manifold units 57 moves through the recycling pipe 65, and is supplied to the inlet manifold units 55 after passing through a heat exchanger 41a, a blower 43 and the reformer 45. Here, the function of the blower 43 is to add kinetic energy to hydrogen gas, thereby feeding the hydrogen gas to the reformer 45 under pressure.

Both the recycling pipe 65 and the fuel supply pipe 33 commonly pass through the heat exchanger 41a, so heat exchange between the recycling pipe 65 and the fuel supply pipe 33 occurs in the heat exchanger 41a. In other words, fuel that flows from an external source to the reformer 45 through the fuel supply pipe 33 is heated by high-temperature hydrogen gas that moves through the recycling pipe 65.

Further, combustion gas exhaust pipes 63 extend from the respective cathode out parts 57a. Here, the combustion gas exhaust pipes 63 function to discharge combustion exhaust gas from the cathode out parts 57a to the atmosphere.

Another heat exchanger 41b is provided between the combustion gas exhaust pipe 63 and the air supply pipe 47. The function of the heat exchanger 41b is to perform heat exchange between high-temperature combustion exhaust gas flowing through the combustion gas exhaust pipe 63 and air that is newly supplied through the air supply pipe 47.

Figure 4:
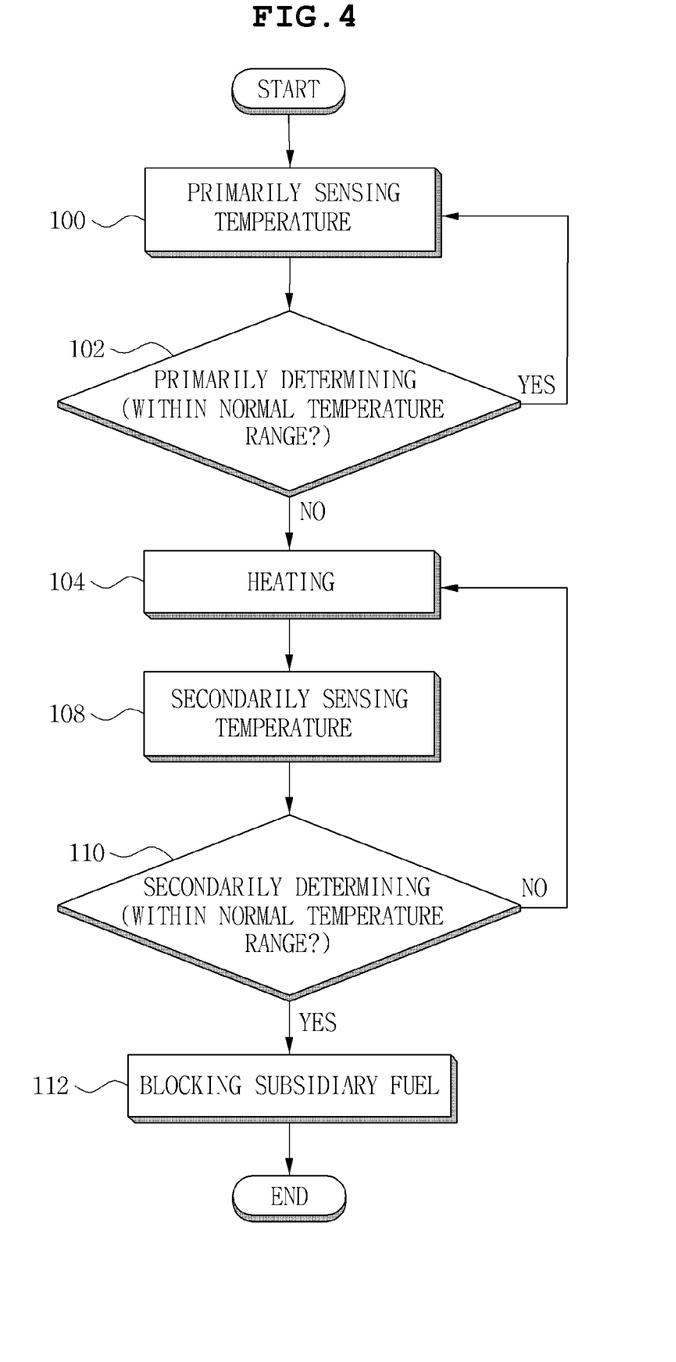
FIG. 4 is a view illustrating a method of individually heating the fuel cell stacks according to an embodiment of the present invention.

FIG. 4 is a view illustrating a method of individually heating the fuel cell stacks according to an embodiment of the present invention. The method of individually heating the fuel cell stacks according to the embodiment of the present invention is to drive the individual heating device of the fuel cell system.

As shown in FIG. 4, the method of individually heating the fuel cell stacks according to the embodiment of the present invention starts at primary temperature sensing operation 100 in which the temperatures of the respective stacks 53 are sensed by the sensors 61. Information about temperatures of the stacks 53 sensed in real time at primary temperature sensing operation 100 is given to an operator and is also applied to the control unit 39.

After finishing primary temperature sensing operation 100, primary determining operation 102 is performed. Here, primary determining operation 102 is an operation for determining whether the present temperatures of the stacks 53 sensed at primary temperature sensing operation 100 are within a normal temperature range or not. At primary determining operation 102, the determination may be performed by the control unit 39 or by an operator. Particularly when general type manual valves are used as the valves 37a, the determination at primary determining operation 102 will be performed by an operator.

When it is determined at primary determining operation 102 that the temperature of a stack is not within the normal temperature range, manifold heating operation 104 is performed in which a valve 37a associated with the relevant stack is opened, thereby supplying subsidiary fuel to an associated cathode out part 57a and heating an associated outlet manifold. Here, the valve 37a may be manually opened by an operator or may be automatically opened under the control of the control unit 39.

However, when is determined at primary determining operation 102 that the temperature of a stack is within the normal temperature range, primary temperature sensing operation 100 is repeated without proceeding to another operation.

After finishing manifold heating operation 104, Secondary temperature sensing operation 108 is performed. Here, secondary temperature sensing operation 108 is an operation for sensing the temperature of the individually heated stack 53 using an associated sensor 61. Information about the temperature of the individually heated stack sensed at secondary temperature sensing operation 108 is given to the operator and is also applied to the control unit 39. The process of secondary temperature sensing operation 108 is equal to that of primary temperature sensing operation 100.

Secondary determining operation 110 is performed after finishing secondary temperature sensing operation 108. Here, secondary determining operation 110 is an operation for determining whether the temperature of the stack 53 individually heated at manifold heating operation 104 is within the normal temperature range or not.

When it is determined at secondary determining operation 110 that the temperature of the stack 53 individually heated at manifold heating operation 104 is not within the normal temperature range, manifold heating operation 104 is repeated.

However, when it is determined that the temperature of the individually heated stack 53 is within the normal temperature range, subsidiary fuel blocking operation 112 is performed in which supply of subsidiary fuel is stopped by controlling the subsidiary fuel supply unit. Here, subsidiary fuel blocking operation 112 is an operation for blocking the flow of subsidiary fuel that flows to the associated cathode out part 57a by closing the associated valve 37a.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Further, simple changes and modifications of the present invention are appreciated as included in the scope and spirit of the invention, and the protection scope of the present invention will be defined by the accompanying claims.

The invention claimed is:

1. A device for heating a fuel cell stack, the device comprising:
    an outlet manifold unit installed outside the fuel cell stack, the outlet manifold unit including:
        a cathode out part through which a first reaction mixture discharged from a cathode of the associated stack passes; and
        an anode out part through which a second reaction mixture discharged from an anode of the associated stack passes, wherein for the outlet manifold unit, the anode out part is separated from the cathode out part by a partition wall;
    a subsidiary fuel supply unit for supplying subsidiary fuel into the cathode out manifold unit such that the subsidiary fuel is burnt in the cathode out manifold unit so as to heat both the outlet manifold unit and the fuel cell stack coming into contact with the outlet manifold unit.

2. The device for heating the fuel cell stack as set forth in claim 1, wherein
    the fuel cell stack comprises two or more stacks that are arranged with an interval defined between the stacks, wherein
    an inlet manifold unit is provided on each of the stacks at a location opposed to the outlet manifold unit based on the stack, the inlet manifold unit supplying fuel and air into the stack.

3. The device for heating the fuel cell stack as set forth in claim 1, wherein the subsidiary fuel supply unit includes:
    a subsidiary fuel pipe for guiding the subsidiary fuel that is a part of fuel supplied to the stack to an interior of the cathode out part of the outlet manifold unit; and
    a flow control unit installed in the subsidiary fuel pipe and controlling a flow rate of the subsidiary fuel flowing through the subsidiary fuel pipe.

4. The device for heating the fuel cell stack as set forth in claim 3, wherein the cathode out part of the outlet manifold unit is provided with a combustion inducing unit for inducing combustion of the subsidiary fuel that has been flowed into the cathode out part.

5. The device for heating the fuel cell stack as set forth in claim 3, further comprising:
   a control unit for controlling the flow control unit; and
   a sensor provided on the stack so as to sense a temperature of the stack, wherein
   the control unit controls the flow control unit based on information about the temperature of the stack outputted from the sensor, thereby controlling an amount of supplied subsidiary fuel.

6. The device for heating the fuel cell stack as set forth in claim 3, wherein a combustion gas exhaust pipe is mounted to the cathode out part and discharges combustion exhaust gas of the subsidiary fuel generated from the cathode out part to outside.

\* \* \* \* \*